June 16, 1964 T. F. PROTZMAN ETAL 3,137,592
GELATINIZED STARCH PRODUCTS
Filed April 3, 1961
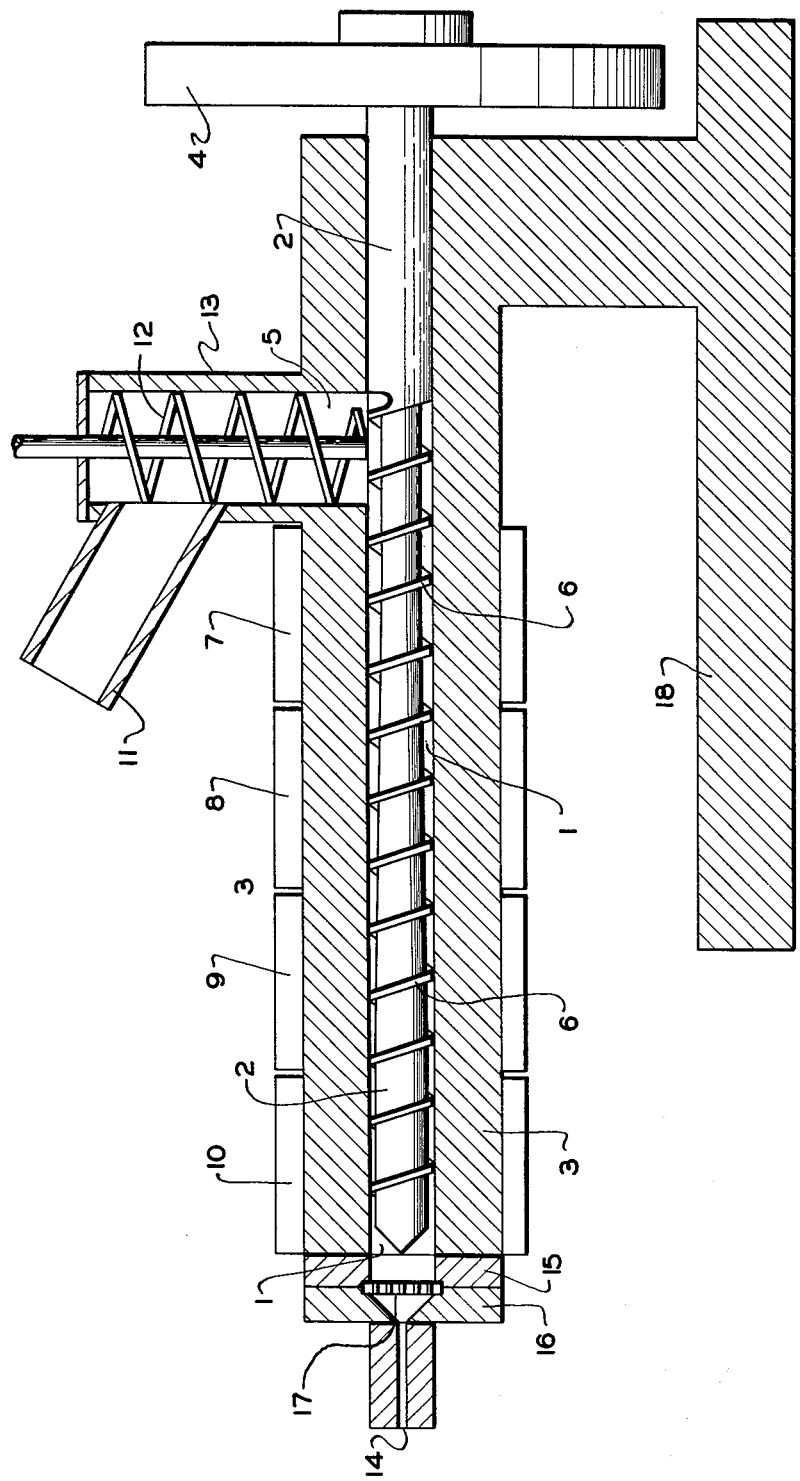

United States Patent Office 3,137,592
Patented June 16, 1964

3,137,592
GELATINIZED STARCH PRODUCTS
Thomas F. Protzman, Decatur, and John A. Wagoner, Mount Zion, Ill., assignors to A. E. Staley Manufacturing Company, Decatur, Ill., a corporation of Delaware
Filed Apr. 3, 1961, Ser. No. 100,354
20 Claims. (Cl. 127—32)

This invention relates generally to an improved method of preparing homogeneous gelatinized starch products having no birefringence or starch granule structure. More specifically, it relates to a method characterized by intense mechanical working or shearing of starch raw material at elevated temperature and pressure in the presence of a minor proportion of a starch-swelling agent.

An important object of this invention is provision of a new method of manufacturing homogeneous gelatinized starch products which, compared with conventional methods, provides a wider range of product physical properties and yet is more easily controlled to yield a highly uniform product of selected properties. Another object is provision of a new continuous method of manufacturing homogeneous gelatinized starch products conveniently and economically with readily available apparatus not heretofore used in starch processing. A further object is to provide a rapid method of manufacturing modified starch products in homogeneous gelatinized form by intense mechanical working of a mixture of starch raw material, starch-modifying reagent, and minor proportion of starch-swelling agent at elevated temperature and pressure. Additional objects will appear in the following description of the invention.

The sole figure in the accompanying drawing is a diagrammatic representation in side elevation of a suitable apparatus for implementing our method.

As used herein, the expressions "starch-modifying reagent," "starch-swelling agent," "starch raw material" and "cold water solubility" are defined as follows:

*Starch-modifying reagent.*—A chemical reagent capable of reacting with starch raw material under the conditions of our method to yield a starch product whose paste properties, particularly those of its water paste, differ from the corresponding paste properties of the parent starch raw material. Starch-modifying reagents are conveniently divided into two broad groups: (1) conventional-type starch-modifying reagents which are hydrolytic or oxidative-hydrolytic in their action and which alter the paste properties of the starch product more by molecular weight reduction than by substitution in the starch chain; and (2) starch derivatizing reagents, generally those which form ethers or esters by reaction with starch hydroxyl groups, and which exert their paste-modifying action primarily by substitution in the starch chain. Thus acid-modified starches and oxidized starches are conventional modified starches; starch ethers and starch esters are derivatized starches.

*Starch-swelling agent.*—A material, either solution or pure substance, which will penetrate or dissolve in the starch granule or small particle of starch raw material at 125°–250° C. and either swell the granule or particle to several times its original size or cause it to disintegrate into smaller fragments. The term "plasticizer" as used herein is synonymous with "starch-swelling agent."

*Starch raw material.*—The starch raw material adaptable to our process is any starch, waxy or non-waxy derived from root, stem or fruit of a plant. It may also consist of a dextrin, a conventional modified starch or a derivatized starch. The dextrin may have been obtained by the application of heat to the parent starch in the absence of a dextrinizing catalyst, such as an acid, for example, or in the presence thereof. Examples of conventional modified starches are thin-boiling starches made by heating a water slurry of native starch below the gelatinization temperature with a mineral acid on one hand and with an oxidizing agent, e.g., alkaline hypochlorite, on the other hand. Typical derivatized starches are starch esters, e.g., starch acetate and starch propionate, and starch ethers, e.g., hydroxyethyl, carboxymethyl, and cyanoethyl. In our method, the starch raw material will generally be in the form of original starch granules, but it may also consist of a previously gelatinized starch product. Gelatinized starch products, e.g., gelatinized native starches, are conveniently and economically modified or derivatized by our method. The starch raw material need not be highly refined, i.e., it may contain small proportions of non-starch material such as protein, fat and fiber. Also, it may consist of a mixture of two or more of the foregoing types.

*Cold water solubility.*—Cold water solubility of the gelatinized modified starch products is the percent by weight of the product dry substance which dissolves in water at 25° C. by the following procedure: One gram of the starch product ground to pass a 40 mesh sieve is shaken two hours with 50 grams of distilled water at 25° C. in a 100 ml. Kohlrausch flask with a Burrell wrist action shaker. Water is then added to the flask to the 100 ml. mark, the contents are mixed thoroughly, transferred to a 250 ml. round bottom centrifuge tube and centrifuged for 15 minutes at 2000 r.p.m. A 25 ml. aliquot of the clear centrifugate is transferred to a tared aluminum pan and evaporated to dryness on a steam bath. The dish is then dried to constant weight in an oven at 110° C. The weight of dried material in the pan multiplied by 400 and divided by the dry substance weight of the original sample is the cold water solubility of the starch product.

In the manufacture of gelatinized starch products, it is common practice to dry a previously prepared aqueous starch paste on hot rolls. A variation of this practice is to feed a fluid suspension of ungelatinized starch granules and a starch-swelling liquid, preferably water or an aqueous solution, to the hot rolls where the slurry is first transformed into a paste of gelatinized starch granules and liquid is then evaporated from the paste to yield a solid product. Alternatively, it is conventional to spray dry or flash dry a starch paste or to coagulate the starch material therein by mixing the aqueous paste with a water-miscible liquid which is not a starch-swelling agent, such as acetone or methanol.

Preparation of homogeneous gelatinized starch products by conventional methods has several drawbacks. The widely-used hot roll method does not yield a homogeneous product unless the starch is thoroughly pasted with hot water beforehand, or unless a rather dilute slurry of starch and water is fed slowly to the rolls. In either case, production rate is low per unit of investment cost and processing cost per unit quantity of final product is high. Furthermore, the roll surfaces and associated doctor blades or stripping knives wear rapidly, thus leading to high maintenance and replacement costs. The spray and flash drying methods yield fine dusty products which are generally difficult to redisperse in water without objectionable lumping. Spray drying process costs are high because the method is limited to fairly fluid pastes, i.e., pastes which seldom exceed 30% starch solids by weight. The paste dehydration method is expensive because there is some unavoidable loss of dehydrating liquid and the cost of recovering the liquid for reuse is appreciable.

Disadvantages also attend the preparation of gelatinized modified starch products by conventional methods. Ungelatinized starch may be modified while preserving the granule form, but the modification reaction is generally slow because the temperature must be kept below the gelatinization temperature of the modified starch, which is generally less than that of the parent starch, and because time is required for the modifying reagent to penetrate the granule. For example, United States Patent 2,516,633 teaches a reaction time of 8–24 hours in the preparation of ungelatinized hydroxyethyl ethers of cereal starches from ethylene oxide and a water suspension of the starch. Another example of slow reaction rate in the preparation of an ungelatinized modified starch is the 8–12 hour reaction time required in the conventional manufacture of acid-modified thin-boiling corn starch. Alternatively, the starch may be pasted first, generally with water, and then reacted with the starch-modifying reagent. This procedure, however, has little if any advantage over the other. The paste viscosity of unmodified starches increases so rapidly with increasing starch solids content that pastes containing more than about 20% by weight of starch solids cannot be satisfactorily stirred and conveyed by conventional equipment, and the high content of water or other starch pasting liquid in the paste leads to large drying or product recovery costs. The preparation of gelatinized modified starch products by first modifying the starch in granule form, then pasting the recovered granules and drying the paste has two drawbacks: (1) substantial loss of soluble starch in the granule modification step, and (2) the inconvenience of the separate pasting and drying steps.

An additional disadvantage of the conventional methods for preparing gelatinized modified starch products stems from operation at atmospheric pressure. This feature either limits the modifying reagents to those with moderate vapor pressures at the selected reaction temperature, or it leads to substantial loss of volatile reagent or to expensive installation of means to cope with the vapor pressure problem.

We have discovered that completely gelatinized starch products are conveniently and economically prepared by intense mechanical working or shearing of a mixture of starch raw material and minor proportion of plasticizer at elevated temperature and pressure for a moderate length of time to yield a homogeneous fluid mass, followed by transfer of the hot fluid mass into a zone of reduced pressure and temperature. The reaction or working time in our method is only a small fraction of the time required to prepare gelatinized modified starch products by prior art methods. It may be as short as 0.5 minute and it seldom exceeds 5 minutes. The pressure in the reduced pressure zone is preferably atmospheric, but it may be higher or lower, and the temperature therein is preferably no greater than that provided by flashing of plasticizer and other volatile materials from the extruded material. The hot fluid mass is transferred from working zone to reduced pressure zone preferably through an orifice or die which shapes the mass into thin strands, ribbons or filaments with large surface-to-volume ratios conducive to flashing of volatile components.

We have also discovered that the rate of reaction between starch raw material and starch-modifying reagent at a given temperature is greatly accelerated in our method. The rate increase is apparently due to the intense shearing or working of the reaction mixture at the specified pressure and temperature.

To be effective in our method, the working or shearing of the starch mixture must be sufficiently intense to raise the mixture temperature adiabatically at least 50° C. In many instances, e.g., where the weight ratio of starch raw material to plasticizer is about 2.5 to 1, the desired working temperature range of 150–160° C. is obtained without supplemental heating, i.e., the temperature rise of the worked mass due to working alone is at least 100–120° C. In some instances, however, the temperature rise due to working may be higher than desired, so that cooling becomes necessary. Our method includes both supplemental heating and cooling of the worked mass to provide the desired temperature control.

Our method has the following important advantages over the prior art methods: (1) its operating cost per unit of product is much less than spray drying and significantly less than roll drying; (2) by comparison with spray and flash drying, it provides a non-dusting product that disperses in water after suitable grinding without objectionable lumping; (3) it is more flexible with respect to range of product physical properties; (4) it markedly reduces the production time for gelatinized modified starch products; (5) it is more easily controlled to obtain a product of uniform selected properties; (6) it is based on use of compact apparatus that is particularly advantageous wherever floor space is limited; and (7) it eliminates the loss of soluble starch in the conventional modification of ungelatinized starches.

An important feature of our method is the combination of intense working of the mixture of starch raw material and plasticizer at elevated temperature. Because of this feature, thorough disintegration or gelatinization of the starch granules is obtained during the working at substantially lower plasticizer contents than those required for equivalent gelatinization by prior art methods. The lower plasticizer requirement, particularly as applied to water, is an additional advantage of our method over the prior art.

The necessary working of the starch mixture in our method is conveniently accomplished with a screw-type plastics extruder. Such apparatus, as illustrated diagrammatically in the drawing, provides efficient means for continuous intense mechanical working at elevated temperature and pressure with easy and accurate control of processing conditions.

Water is the preferred starch-swelling agent or plasticizer for the starch raw material in our method because of its low cost and low boiling point. Because the normal boiling point of water (100° C.) is below the lower limit of working temperature in our method, substantial proportions of water flash (i.e., rapidly vaporize) from the fluid plastic mass when it is transferred to the reduced pressure zone. This convenient removal of some of the preferred plasticizer from the gelatinized starch product and the associated puffing or expansion of the product are important advantages of our method. Other suitable plasticizers are formamide, ethylene diamine, dimethyl sulfoxide, pyrrolidine, urea, piperazine, glycerol, ethylene glycol, sorbitol, propylene glycol, chloral hydrate, and dimethyl formamide. Mixtures of two or more plasticizers may be used satisfactorily. Those plasticizers having boiling points substantially above 100° C. and which flash less than water can, if desired, be removed from the reaction mixture by known methods, e.g., by vacuum drying or by extraction with a selective solvent, such as acetone or methanol. In general, any inert material, either solution or pure substance, is a suitable starch-swelling agent if it will penetrate or dissolve in the particle of starch raw material (generally a native or a modified starch in original granule form) at the working temperature, and either swell the particle or cause it to disintegrate into smaller fragments. By inert material is meant one that does not hydrolyze, oxidize, derivatize or otherwise react chemically with the starch raw material under the operating conditions of our mehthod.

At the elevated temperature and in the presence of plasticizer, the mixture of starch raw material and plasticizer (plus starch-modifying reagent when present) is transformed into a homogeneous viscous fluid mass by the mechanical working of our method. The plasticizer or starch-swelling agent need not be chemically inert to the starch-modifying reagent used in our method. For example, glycerol is a suitable plasticizer despite its reactivity with starch-esterifying and starch-etherifying reagents generally.

The optimum proportion of plasticizer in our method varies with the kind of starch, the temperature and the pressure. In general, a higher plasticizer content is required for native starch or a conventional modified starch than a derivatized starch, and less plasticizer is needed as the temperature and/or pressure are increased. The minimum proportion of plasticizer is about 22% by weight of the starch raw material dry substance, and the maximum proportion is about 67% on the same basis. This range of proportions applies to mixtures of plasticizers also, and includes moisture content of the starch raw material. Above the maximum useful proportion of plasticizer, the reaction promoting and granule disintegrating effects of the working drop off rapidly. This is believed to be due to reduced shear attending the increased plasticity. Furthermore, the later separation of plasticizer from gelatinized starch product, to yield a dry grindable material, becomes more of a problem. Below the minimum plasticizer proportion, the necessary fluid condition is not attained under the conditions of our method, and working of the starch mixture requires excessive consumption of power and equipment maintenance. The preferred range of plasticizer proportions generally and for water in particular, is about 28% to about 40% by weight of the starch raw material dry substance.

The practical upper limit of reaction pressure in our method is determined by practical equipment available for the required working, and the value is above 20,000 p.s.i. The lower limit of pressure is the autogenous vapor pressure of the starch mixture at the reaction temperature.

A wide range of weight proportion of starch-modifying agent to starch raw material is permissible in our method. For example, useful modified starch products may be obtained by reaction of a starch raw material with as little as 0.01% by weight of hydrogen chloride, 0.1% by weight of epichlorohydrin, and 0.5% by weight of potassium persulfate. On the other hand, much higher weight proportions of the derivatizing type of starch-modifying reagents may be used in our method. Mixtures containing from 15 to 25 parts by weight of chemical reagents, such as beta-propiolactone, vinyl acetate, butyric anhydride and sodium monochloroacetate per 100 parts by weight of starch raw material dry substance are easily and rapidly reacted by our method. Still higher weight proportions of starch-modifying reagent ranging to about 50% of the starch raw material dry substance can be reacted with the starch raw material at maximum working time.

The upper limit of working temperature in our method is about 250° C. Above this value, the disadvantages of product discoloration and thermal degradation more than counterbalance the advantages of increased starch plasticity and faster reaction between starch raw material and starch-modifying reagent. The lower limit of working temperature is about 125° C. This minimum temperature, in combination with the shearing and the starch-swelling agent, is required to disintegrate the individual starch raw material particles and to transform the starch mixture into the desired homogeneous fluid mass.

The conventional screw-type plastics extruder, as illustrated diagrammatically in the drawing, is an excellent apparatus for implementing our method because it provides convenient and efficient means for continuous intense working of starch raw material (with or without starch-modifying reagent) and starch-swelling agent at elevated temperature and pressure with easy and accurate control of processing conditions. It also provides, with its die, convenient means for transferring the worked hot fluid mass of gelatinized starch product in the form of thin strands, ribbons or filaments from the zone of elevated temperature and pressure into a zone of substantially reduced temperature and pressure.

As indicated above, our method is applicable to starch raw materials broadly, i.e., any native starch, or conventional-modified starch or derivatized starch in original granule form or in the form of a completely or partially gelatinized product. In general, our method is adaptable to any starch raw material that pastes or gelatinizes with a starch-swelling agent under the conditions of our method.

The starch products made according to our invention have the common property of pasted or gelatinized form. They are devoid of birefringence and starch-granule structure. They may contain substantially all of the original plasticizer content of the milled mixture, or only a part thereof. Preferably the plasticizer content of the finished product is adjusted to the range of 10–15% by weight, either by flashing as the product emerges from the working zone, or by subsequent drying or extraction with a selective volatile solvent, e.g., methanol or acetone. The products containing the preferred plasticizer content are friable solids at room temperature which can be easily ground to non-caking meals or powders of selected particle size. At 10–15% plasticizer content and at 40–60 mesh particle size, all the products dissolve or disperse to some extent in 10 parts by weight of water at 25° C. All of the products containing not less than about 22% plasticizer based on starch dry substance can be repeatedly worked and heated according to our method to increase the extent of original modification or to superimpose another modification of the starch raw material. The cold water solubility of the gelatinized starch products varies from high to low values. Also, the appearance and viscosity of the hot water pastes vary from product to product. Water solubility and water paste properties of the products depend mainly upon processing conditions, and the nature of the parent starch raw material and starch-modifying reagent.

The temperature and plasticizer content of the extruded product depend upon several factors, chiefly, kind of plasticizer, initial proportion of plasticizer and working temperature. If desired, however, the product may be cooled by known methods to temperatures lower than that obtained by flashing to atmospheric pressure. Also, if desired, the plasticizer content of the product at this point may be altered, generally to a lower value. This can be done by drying under vacuum or at atmospheric pressure, depending upon plasticizer volatility, or it can be done by extracting the plasticizer with a selective solvent, such as acetone or methanol.

Gelatinized starch products made according to our method and having plasticizer contents substantially above the preferred range of 10–15% by weight and below 50% are generally firm gels at 25° C. Some may be satisfactorily reduced to a fine or medium-fine granular state by careful grinding or cutting, e.g., by use of a suitable cutter or chopper, but many are too plastic to be ground satisfactorily in attrition mills. Products having plasticizer contents in the upper portions of the range, e.g., 50–67% by weight, are generally soft gels at 25° C., and may occasionally consist of highly viscous syrups.

Starch products made according to our method are useful generally wherever gelatinized starch products have heretofore been used. For example, they are useful in paper manufacture and coating, textile sizing, oil well drilling muds, laundry starches, pie fillings, and charcoal briquettes. The foregoing broad utility of products made according to our method is not restricted to those products containing the preferred or lower contents of plasticizer; it accompanies those products having any of the higher permissible plasticizer contents, i.e., up to 67% by weight.

The method of our invention is applicable to starch derivatizing reagents and conventional starch-modifying reagents in general. Solid and liquid reagents which can be easily mixed beforehand with the starch raw material and starch-swelling agent at room temperature and atmospheric pressure are the most convenient in our method, but others can be used successfully. Even gaseous or low-boiling liquid reagents can be metered under pressure into the mixture of starch raw material and plasticizer as it enters the zone of intense working, particularly at the feed end of the plastics extruder. It is an advantageous feature of our method that a wide variety of reagents in solid, liquid, or vapor form may be used. The principal conventional modifications of starch are obtained by hydrolytic agents (acids) or by oxidizing agents, and generally the derivatized starches are esters of ethers. A partial listing of broad classes of starch-derivatizing reagents and conventional starch modifying reagents is as follows: inorganic acids, inorganic bases, organic acids, organic acid anhydrides, organic acid halides, vinyl monomers, lactones, peroxides, per-acids, salts of per-acids, hypohalites (e.g., sodium hypochlorite), azo-compounds, amines, quaternary ammonium compounds, aldehydes, halides of inorganic acids, and epoxy compounds.

Examples of specific conventional-type starch-modifying reagents are the following: mineral acids, e.g., hydrochloric, sulfuric, phosphoric; organic acids, e.g., acetic, oxalic, benzoic, levulinic; oxidizing agents, e.g., sodium hypochlorite, calcium hypochlorite, potassium permanganate, potassium persulfate, sodium perborate, hydrogen peroxide, benzoyl peroxide, hypochlorous acid.

Examples of specific starch-derivatizing reagents are as follows: acylating agents—anhydrides of carboxylic acids, e.g., acetic anhydride, n-butyric anhydride, succinic anhydride, isatoic anhydride, quinolinic anhydride, phthalic anhydride; acid halides of carboxylic, sulfonic and phosphoric acids, e.g., n-butyryl chloride, benzene sulfonyl chloride and phosphorus oxychloride respectively; beta propiolactone and phenylisocyanate; vinyl esters of fatty acids, e.g., vinyl acetate, vinyl n-butyrate; ketene; monofunctional etherifying agents—monohalogenated fatty acids, e.g., monochloroacetic acid, alpha bromopropionic acid; halohydrins, e.g., ethylene chlorohydrin, propylene chlorohydrin, glyceryl alpha chlorohydrin; vicinal alkylene monoepoxides, e.g., ethylene oxide, propylene oxide, 3-diethyl amino 1,2-epoxypropane, 3-dibutyl amino 1,2-epoxypropane, N-(2,3-epoxypropyl)-piperidine, N,N-(2,3-epoxypropyl) methyl aniline, cyclohexane oxide, styrene oxide; alkyl monohalides, e.g., methyl chloride, ethyl chloride, beta-diethylamino ethyl chloride, beta-methylamino isopropyl chloride, beta-dimethyl amino ethyl chloride; neutral alkyl esters of polybasic inorganic oxy acids, e.g., dimethyl sulfate, diethyl sulfate, triisopropyl borate, tributyl phosphate, tetraethyl orthosilicate, triethyl phosphite; imines, e.g., ethylene imine, propylene imine; acrylic compounds, e.g., acrylonitrile, acrylamide, methacrylamide, acrolein, ethyl acrylate, methyl acrylate, n-butyl acrylate; polyfunctional etherifying agents, e.g., epichlorohydrin, ethylene dibromide, butadiene diepoxide.

In general the starch derivatizing reagents require an alkaline reaction condition or an alkaline catalyst to promote their reaction with the starch raw material. Alkali and alkaline earth hydroxides and carbonates such as sodium hydroxide, potassium carbonate, and calcium hydroxide are suitable. Alkali salts of weak acids, such as sodium silicate and sodium aluminate, may be used. Organic bases, such as tertiary amines and quaternary ammonium hydroxides, are also effective catalysts. On the other hand, the catalyst may be acidic (e.g., sulfuric acid), or a neutral salt (e.g., sodium chloride), or it may be omitted in some reactions. As a rule, the same catalyst or reaction pH that is suitable for the conventional method of reaction is also suitable in our method.

The following description of our method is directed to the accompanying drawing which illustrates diagrammatically a conventional screw type plastics extruder. The extruder has a long barrel or cylinder 1 of uniform bore which carries a snugly fitting screw 2. The barrel wall 3 is constructed of metal to withstand internal pressures as high as 20,000 p.s.i., and it is firmly attached to a heavy base 18. The screw is rotated by a motor (not shown in the drawing) through an appropriate reducing gear 4. The ratio of screw length to diameter usually exceeds 6 to 1 and ratios as high as 36 to 1 may be employed. Preferred ratios are those lying within the range of 12:1 to 24:1. The barrel wall contains an opening 5 near one end through which the reaction mixture of starch raw material, plasticizer, reagent and catalyst is fed to the screw. The reaction mixture may be fed to the extruder under slight pressure obtained by a conventional screw feeder, as shown, equipped with hopper 11, worm or screw 12, and barrel 13 which is joined to extruder opening 5. When the extruder screw is turned in the proper direction, the continuous rib 6 of the screw moves the reaction mixture along the barrel away from the opening. The barrel is equipped with four separately controlled electric heating mantles 7, 8, 9, 10, and in larger units the screw may be hollow and arranged for internal heating. The electrical heating mantles may be replaced with steam jackets or other heating means as desired. If required, the barrel and screw can also be equipped for cooling by circulation of a cooling fluid. If the desired temperature in the reaction mixture is not obtained by shear and compression, heat is applied through the barrel (and screw if needed). The combination of heat, pressure, and shearing or working converts the initially granular and superficially dry reaction mixture into a fluid mass. The mass is thoroughly mixed and masticated as it is forced along the barrel by the rotating screw. Owing to preferred design of the screw, in which the rib height decreases toward the discharge end of the extruder, the reaction mixture is subjected to increasing pressure as it moves along the barrel and is thus compacted or compressed. The discharge end is equipped with a head gate and a die 14. Water and other liquids in the reaction mixture remain liquid, even though the temperature is far above their normal boiling points, because of the high pressures developed by the screw. The head gate consists of two heavy hinged plates 15, 16 enclosing a perforated breaker plate 17. The die shapes the fluid reaction mixture as it leaves the extruder. The die is also an orifice which serves to restrict the flow of plastic reaction mass enough to keep the pressure at the die above the vapor pressure of the mixture.

Use of a conventional die at the discharge end of the extruder is preferred primarily because of the advantages obtained by proper shaping of the extruded strand of material. Formation of thin strands, ribbons, or filaments is conducive to rapid flashing of plasticizer and consequent puffing or expansion of the product. Our method can be carried out, however, with an extruder having no conventional die or equivalent head gate at the discharge end. For example, the reaction mixture can be kept under the required minimum pressure and discharged as a thin ribbon or strand conducive to efficient flashing of volatile plasticizer by suitable reduction in screw flight depth at the discharge end. The product then emerges as a thin-walled tube.

As the fluid reaction mass emerges from the die, a portion of the plasticizer may flash into vapor. Extensive flashing of superheated plasticizer occurs only if the exit temperature is substantially above the boiling point of the plasticizer. Extensive flashing puffs or expands the emerging product into a porous mass which usually takes the form of a continuous ribbon or rope. At the same time, the product is cooled and generally congeals to a solid or semi-solid state.

High-boiling plasticizers, e.g., glycerol and dimethyl sulfoxide, which flash to less extent than water for example, can be removed from the extruded product by vacuum drying or by extraction with a volatile liquid such as acetone which dissolves the plasticizer but not the starch product.

The flashing of superheated low-boiling plasticizer (e.g., water) from the extruded product at the higher reaction temperatures is an important advantageous feature of our method. An associated advantage is the immediate lowering of product temperature, which generally converts the extruded fluid into a solid or semi-solid product adaptable to transportation on a moving belt and further drying thereon if necessary. Another advantage is the associated drying of the product which frequently eliminates the need of additional drying. Thus the elevated temperature in our method serves three useful purposes: (1) it helps liquefy the reaction mixture; (2) it accelerates the reaction between starch raw material and reagent; and (3) it provides for convenient flashing of superheated plasticizer from the extruded reaction mass.

If the extruded and cooled product is too plastic for conventional grinding, the plasticity can be reduced the necessary amount by conventional vacuum drying or extraction with a suitable selective solvent. Some reaction mixtures may be so fluid after flashing and cooling to room temperature, owing to high residual plasticizer content, that they will require further removal of plasticizer by conventional methods and equipment adapted to handle such material.

An important advantage of our method is the ease with which the bulk density of the dried and ground product may be controlled over a rather wide range. This is particularly true of those products made with water as the starch-swelling agent or plasticizer. Bulk density can be regulated in two ways: (1) by varying the extrusion temperature and the weight proportion of water (or other low boiling plasticizer) in the reaction mixture at constant die opening, and (2) by varying the die opening at constant temperature and plasticizer content to obtain extruded strands or filaments of different thickness. Both methods depend upon variations in puffing or expansion of the product due to flashing of superheated plasticizer. In the first method, more puffing (i.e., more reduction in bulk density) is obtained by raising the extrusion temperature or by increasing the plasticizer content of the extruded material. In the second method, puffing increases as the thickness of the extruded strand or filament is decreased because of reduced resistance to flashing of interior plasticizer.

The following examples are illustrative embodiments of our invention. All parts and proportions are by weight unless otherwise specified.

*Example 1*

This example illustrates the preparation of a gelatinized acid-modified thin-boiling corn starch. Commercial native corn starch (114 parts) containing 12% moisture is mixed with 20 parts of dilute aqueous hydrochloric acid containing 0.022 part of HCl. The moistened acidified starch contains about 25% water and the pH of its slurry in 10 parts of water is about 3.8. The starch is fed continuously under slight pressure to a conventional screw-type plastics extruder of the type shown diagrammatically in the drawing. The screw is 62 inches long, 2.5 inches in diameter and has a pitch of about 2.5 inches. In the first 16 inches of the screw (measured from the feed port), the screw flight depth is uniformly 0.4 inch, i.e., the helix rib projects radially 0.4 inch beyond the screw shaft. In the next 31 inches of the screw, the flight depth decreases uniformly from 0.4 inch to 0.16 inch, and in the remaining 15 inches of the screw, the flight depth remains constant at 0.16 inch. This construction of the screw—deep flights at the feed end gradually changing to shallow flights at the discharge end—facilitates (1) the feeding of granular material into the screw, (2) the compression or compacting of the loose feed material into a mass relatively free of interstices, and (3) the final metering or discharge of the reaction mixture as a viscous fluid or plastic solid. The screw is rotated at about 100 r.p.m. with an electric motor (not shown in the drawing) equipped with variable speed drive whose pinion engages large gear 4 attached as shown to the screw. The barrel of the extruder is equipped with four electric heating mantles 7, 8, 9, 10, each one controlled independently of the others with a rheostat. The screw is cored from its driven end to within a few inches of the other end (not shown in the drawing) so that it can be heated or cooled by appropriate circulation of fluids. In this example, no heat is applied to the screw through the heating mantles or through the screw core. The work done on the starch mixture by the screw develops enough heat to convert the mixture into a fluid mass and raise its temeprature to about 155° C. at the discharge end of the extruder. Pressures, indicated by gauges (not shown in the drawing) sensing the reaction mixture pressure at about the midpoint of the screw and at the head gate 15, 16, are about 3,400 p.s.i. and 600 p.s.i., respectively. The fluid reaction product is forced through perforated plate 17 in the head gate and through die 14, the latter consisting of a cylindrical duct 0.25 inch in diameter and 6.25 inches long. The detention time in the extruder is about 0.75 minute, and the production rate of finished product (12% moisture) is about 160 pounds per hour. As soon as it issues from the die, the product expands into a highly porous continuous strand of congealed solid material. The expansion is caused by flashing of superheated water into steam and is accompanied by rapid cooling of the product. The continuous strand of porous congealed product is conveyed by a moving belt through a combination cooler-drier where it is cooled to about room temperature and dried to a final moisture content of about 12% with a current of dry cool air. The product, which is brittle and friable at this stage, is crushed to pass a 40 mesh sieve. It is 26% soluble in cold water and disperses completely in hot water, forming a mildly-acid low-viscosity paste at 11% solids. The thin paste sets to a firm gel when cooled to room temperature and aged for 24 hours. The product properties are similar to those of a rather highly acid-modified commercial thin-boiling corn starch.

Descriptive information about 15 additional examples is listed in the following Tables 1 and 2. All of the examples are based on the same extruder and the same general technique used in Example 1. The oxidized starch raw material in Example 8 has a 15 gram Saybolt viscosity of 60, the starch raw material in Example 9 is made by pasting the oxidized starch raw material of Example 8 and drying the paste on hot rolls, and the starch raw material in Example 11 is made according to Example 1 in United States Patent 2,516,634. The numbers separated by commas from the names of materials in the first four columns of Table 1 are parts by weight. The hot water pastes referred to in column 3 of Table 2 are those made by stirring 10 parts of the product with 90 parts of water at 95° C.

Table 1

| Example No. | Starch Raw Material | Starch Swelling Agent | Starch Modifying Reagent | Reaction Catalyst | Head Gate Temp. (° C.) | Screw, r.p.m. |
|---|---|---|---|---|---|---|
| 2 | Native corn starch, 100 | Water, 33 | Potassium persulfate, 0.5 | None | 150 | 100 |
| 3 | ---do--- | Water, 32 | Sodium monochloroacetate, 15 | Sodium hydroxide, 5 | 153 | 100 |
| 4 | ---do--- | Water, 36 | Epichlorohydrin, 0.1 | Sodium hydroxide, 0.5 | 151 | 100 |
| 5 | ---do--- | Water, 37 | Beta-propiolactone, 12 | Sodium hydroxide, 5 | | 100 |
| 6 | ---do--- | Water, 33 | Vinyl acetate, 20 | ---do--- | 155 | 100 |
| 7 | Native potato starch, 100 | Water, 34 | Potassium persulfate, 0.5 | None | 147 | 100 |
| 8 | Oxidized corn starch, 100 | Water, 33 | Vinyl acetate, 20 | Sodium hydroxide, 5 | 149 | 100 |
| 9 | Gelatinized oxidized corn starch, 100 | ---do--- | ---do--- | ---do--- | 151 | 100 |
| 10 | Native corn starch, 100 | Water, 34 | Potassium persulfate, 0.5 | None | 123 | 50 |
| 11 | Corn starch hydroxyethyl ether, 100 | Water, 20 | Vinyl acetate, 10 | Sodium carbonate, 5 | 182 | 100 |
| 12 | Native corn starch, 100 | Water, 49 | Epichlorohydrin, 0.2 | Sodium hydroxide, 1 | 145 | 100 |
| 13 | ---do--- | Water, 17; dimethyl sulfoxide, 23 | Sodium monochloroacetate, 7.5 | Sodium hydroxide, 3 | 167 | 100 |
| 14 | ---do--- | Water, 17; glycerol, 23 | ---do--- | ---do--- | 163 | 100 |
| 15 | ---do--- | Water, 14.5; dimethyl sulfoxide, 23 | Propylene oxide, 7 | Sodium hydroxide, 0.5 | 166 | 100 |
| 16 | ---do--- | Water, 14.5; glycerol, 23 | ---do--- | ---do--- | 162 | 100 |

Table 2

| Example No. | Moisture Content After Grinding (Percent) | Cold Water Solubility (Percent) | Hot Water Paste Properties | Analytical Data |
|---|---|---|---|---|
| 2 | 12.5 | 61 | Thin, cloudy, congealing. | 1.7% carboxyl content. |
| 3 | 13 | 41 | Thick, clear, non-congealing. | |
| 4 | 12 | 16 | Thick, cloudy, non-congealing. | |
| 5 | 9 | 24 | Thick, clear, non-congealing. | |
| 6 | 10 | 25 | ---do--- | 3.8% acetyl content. |
| 7 | 12 | 65 | Thin, clear, congealing. | 1.6% carboxyl content. |
| 8 | 11.5 | 48 | Thin, clear, non-congealing. | 7.1% acetyl content. |
| 9 | 11 | 67 | ---do--- | 6.6% acetyl content. |
| 10 | 12 | 28 | Thin, cloudy, congealing. | 0.4% carboxyl content. |
| 11 | 10.5 | 73 | Viscous, clear, non-congealing. | |
| 12 | 11 | 13 | Thin, cloudy, non-congealing. | |
| 13 | 8 | 95 | Viscous, clear, non-congealing. | 1.74% carboxyl content. |
| 14 | 9 | 71 | ---do--- | 1.1% carboxyl content. |
| 15 | 10 | 26 | Thin, cloudy, non-congealing. | 5.6% hydroxypropyl content. |
| 16 | 10 | 17 | ---do--- | 6.8% hydroxypropyl content. |

EXAMPLE 17

This example illustrates the preparation of a gelatinized unmodified corn starch. Commercial native corn starch (114 parts) containing 12% moisture is mixed with 16 parts of water. The moistened starch contains 23% water on an "as is" basis or 30% on a dry substance basis. The moistened starch is fed continuously under slight pressure to a conventional screw-type plastics extruder described in Example 1. The screw is rotated at 40 r.p.m. The work done on the starch mixture by the screw develops enough heat to convert the mixture into a fluid mass and raise its temperature to about 175° C. at the extruder head gate. Pressure indicated by a gauge (not shown in the drawing) sensing the pressure at the head gate 15, 16 is about 2,000 p.s.i. The fluid product is forced through perforated plate 17 in the head gate and through die 14, the latter consisting of a cylindrical duct 0.125 inch in diameter and 6.25 inches long. The detention time in the extruder is about 1.5 minutes. As soon as it issues from the die, the product expands into a highly porous continuous strand of congealed solid material. The expansion is caused by flashing of superheated water into steam and is accompanied by rapid cooling of the product. The continuous strand of porous congealed product is conveyed by a moving belt through a combination cooler-drier where it is cooled to about room temperature and dried to a final moisture content of about 12% with a current of dry cool air. The product, which is brittle and friable at this stage, is crushed to pass a 40 mesh sieve. It is 51% soluble in cold water and disperses completely in hot water, forming a viscous paste at 11% solids. The paste sets to a firm gel when cooled to 30° C. and aged 24 hours.

EXAMPLE 18

This example illustrates the preparation of a gelatinized acid-modified corn starch. Example 1 is repeated with the following exceptions in materials and operating conditions: (1) the native corn starch is replaced with an equal weight of 12% moisture acid-modified corn starch in original granule form having a Brookfield viscosity of 50 centipoises at 175° F. and 10.5% starch solids by weight; (2) the added water is 8 parts so that the moistened starch contains 18% water on an as is basis and 22% water on a dry substance basis; (3) the extruder screw turns at 75 r.p.m.; (4) the detention time of the starch in the extruder barrel is one minute and (5) the starch temperature at the extruder head gate is about 200° C. The extruded liquid mass puffs and congeals to a porous continuous strand of solid gelatinized starch in much the same manner as in Example 1. The congealed product is conveyed by moving belt through a combination cooler-drier where it is cooled to about 30° C. and dried to a moisture content of about 12% with a current of cool dry air. The friable product, crushed to pass a 40 mesh sieve, has a cold-water solubility of 77% and disperses completely in 10 parts of hot water at 95° C. forming a low-viscosity paste which sets to a firm gel when cooled to 30° C. and aged for 24 hours.

EXAMPLE 19

This example illustrates the preparation of a gelatinized oxidized corn starch. Example 1 is repeated with the following exceptions in materials and operating conditions: (1) the native corn starch is replaced with an equal weight of 12% moisture hypochlorite-oxidized corn starch in original granule form having a Brookfield viscosity of 6 centipoises at 175° F. and 10.5% starch solids by weight; (2) the added water is 11 parts so that the moistened starch contains 20% water on an as is basis and 25% water on a dry substance basis; (3) the extruder screw turns at 100 r.p.m.; (4) the detention time is 0.75 minute, and (5) the starch temperature at the extruder head gate is about 150° C. Extrusion, puffing and drying of the product is similar to that of Example 2. The final product, dried to about 12% moisture and ground to pass a 40 mesh sieve, has a cold-water solubility of 100% and readily disperses in 10 parts of water at 95° C. to yield a low-viscosity noncongealing paste.

EXAMPLE 20

This example illustrates the preparation of a gelatinized derivatized corn starch. Example 1 is repeated with the following exceptions in material and operating conditions: (1) the native corn starch is replaced with an equal weight of 12% moisture dextrinized starch in original granule form having a cold-water solubility of 7% and a Brookfield viscosity of 4.5 centipoises at 175° F. and 10.5% starch solids by weight; (2) the added water is 11 parts so that the moistened starch contains 20% water on an as is basis and 25% water on a dry substance basis; (3) the extruder screw turns at 85 r.p.m.; the detention time is 40 seconds, and (4) the starch temperature at the extruder head gate is about 150° C. Extrusion, puffing, and drying of the product is similar to that of Example 2. The final product, dried to about 12% moisture and ground to pass a 100 mesh sieve, has a cold-water solubility of 85% and readily disperses in 10 parts of water at 95° C. to yield a low viscosity paste which thickens substantially on cooling to 30° C. and aging for 24 hours.

Although mixing of starch and swelling agent (and starch-modifying reagent when used) prior to feeding the mixture to the extruder is preferred, as indicated in the foregoing examples, our method can be carried out by feeding the materials separately to the extruder and mixing them together with the extruder screw.

We claim:

1. The method of preparing a homogeneous gelatinized starch product that comprises forming a hot fluid homogeneous mas of starch raw material and starch-swelling agent at elevated temperature and pressure by working a mixture of starch raw material and starch-swelling agent in a confining chamber for about 0.5 to about 5 minutes at temperature of about 125°–250° C. and pressure substantially above autogenous vapor pressure of the mixture, and immediately thereafter transferring the material into a zone of substantially lower pressure and temperature, the proportion of starch-swelling agent ranging from about 22% to about 67% by weight of the starch raw material dry substance, and the working being sufficient to provide an adiabatic temperature rise of at least 50° C. in the worked mass.

2. The method of preparing a homogeneous gelatinized starch product that comprises forming a hot fluid homogeneous mass of starch raw material and starch-swelling agent in a zone of elevated temperature and pressure by continuously advancing a mixture of starch raw material and starch-swelling agent through a barrel while simultaneously, for a period of about 0.5 to about 5 minutes, (1) maintaining the mixture temperature within the range of about 125° to about 250° C., (2) working the mixture to transform it into a homogeneous fluid mass and to liberate enough heat to raise the temperature thereof adiabatically at least 50° C. and (3) maintaining a pressure on the mixture in excess of its autogenous vapor pressure, then immediately transferring the worked mass into a zone of substantially reduced pressure and temperature, the proportion of starch-swelling agent ranging from about 22% to about 67% by weight of the starch raw material dry substance.

3. The method according to claim 1 wherein the starch-swelling agent is water.

4. The method according to claim 2 wherein the starch-swelling agent is water.

5. The method according to claim 4 wherein the proportion of water ranges from about 28% to about 40% by weight of the starch raw material dry substance.

6. The method according to claim 5 wherein the controlled temperature ranges from about 150° to about 200° C.

7. The method according to claim 2 wherein the worked mass is transferred from the zone of elevated temperature and pressure into a zone of substantially reduced temperature and pressure through a die.

8. The method according to claim 7 wherein the starch-swelling agent is water.

9. The method according to claim 8 wherein the proportion of water ranges from about 28% to about 40% by weight of the starch raw material dry substance.

10. The method according to claim 9 wherein the controlled temperature ranges from about 150° to about 200° C.

11. The method of preparing a gelatinized modified starch product that comprises forming a hot fluid homogeneous mass of starch raw material, starch-modifying reagent and starch-swelling agent and promoting reaction between starch raw material and starch-modifying reagent by working a mixture of starch raw material, starch-modifying reagent and starch-swelling agent for about 0.5 to about 5 minutes in a confining chamber at temperature ranging from about 125° C. to about 250° C. and at pressure substantially above the autogenous vapor pressure of the mixture at said temperature and immediately thereafter transferring the fluid mass to a zone of substantially reduced pressure and temperature, the proportion of starch-swelling agent ranging from about 22% to about 67% by weight of the starch raw material dry substance, the proportion of starch-modifying reagent ranging from about 0.01% to about 50% by weight of the starch raw material dry substance and the working being sufficient to provide an adiabatic temperature rise of not less than about 50° C. in the worked mass.

12. The method of preparing a homogeneous gelatinized modified starch product that comprises forming a hot fluid homogeneous mass of starch raw material, starch-swelling agent and starch-modifying reagent in a zone of elevated temperature and pressure by continuously advancing a mixture of starch raw material, starch-modifying reagent and starch-swelling agent through a barrel while simultaneously, for a period of about 0.5 to about 5 minutes, (1) maintaining the temperature of the mixture within the range of about 125° C. to about 250° C., (2) working the mixture to transform it into a homogeneous fluid mass, to accelerate the reaction between starch raw material and starch-modifying agent and to liberate enough heat to raise the temperature thereof adiabatically at least about 50° C., (3) maintaining a pressure on the mixture in excess of its autogenous vapor pressure at said temperature, then immediately transferring the worked mass into a zone of substantially reduced pressure and temperature, the proportion of starch-swelling agent ranging from about 22% to about 67% by weight of the starch raw material dry substance, and the proportion of starch-modifying reagent ranging from about 0.01% to about 50% by weight of the starch raw material dry substance.

13. The method according to claim 11 wherein the starch-swelling agent is water.

14. The method according to claim 12 wherein the starch-swelling agent is water.

15. The method according to claim 14 wherein the proportion of water ranges from about 28% to about 40% by weight of the starch raw material dry substance.

16. The method according to claim 15 wherein the controlled temperature ranges from about 150° to about 200° C.

17. The method according to claim 12 wherein the worked mass is transferred from the zone of elevated temperature and pressure through a die into a zone of substantially reduced temperature and pressure.

18. The method according to claim 17 wherein the starch-swelling agent is water.

19. The method according to claim 18 wherein the proportion of water ranges from about 28% to about 40% by weight of the starch raw material dry substance.

20. The method according to claim 19 wherein the controlled temperature ranges from about 150° to about 200° C.

References Cited in the file of this patent

UNITED STATES PATENTS

| | | |
|---|---|---|
| 2,105,052 | Oltmans | Jan. 11, 1938 |
| 2,417,969 | Caesar et al. | Mar. 25, 1947 |